(12) United States Patent
Yang et al.

(10) Patent No.: US 8,166,328 B2
(45) Date of Patent: Apr. 24, 2012

(54) LOW POWER CONSUMPTION PROCESSOR

(75) Inventors: Yil-Suk Yang, Daejeon (KR); Tae-Moon Roh, Daejeon (KR); Soon-Il Yeo, Daejeon (KR); Jung-Hee Suk, Daejeon (KR); Chun-Gi Lyuh, Daejeon (KR); Ik-Jae Chun, Daejeon (KR); Se-Wan Heo, Busan (KR); Jong-Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 461 days.

(21) Appl. No.: 12/427,291

(22) Filed: Apr. 21, 2009

(65) Prior Publication Data

US 2010/0162016 A1   Jun. 24, 2010

(30) Foreign Application Priority Data

Dec. 22, 2008   (KR) ........................ 10-2008-0131065

(51) Int. Cl.
*G06F 1/00* (2006.01)
(52) U.S. Cl. ...................................... 713/324; 713/320
(58) Field of Classification Search .................... 713/320
See application file for complete search history.

(56) References Cited

U.S. PATENT DOCUMENTS

| | | | |
|---|---|---|---|
| 6,307,281 B1 | 10/2001 | Houston | |
| 6,625,740 B1 * | 9/2003 | Datar et al. | 713/324 |
| 7,107,471 B2 * | 9/2006 | Feierbach | 713/324 |
| 7,366,921 B2 | 4/2008 | Ranganathan | |
| 7,412,613 B2 | 8/2008 | Park | |
| 7,441,136 B2 * | 10/2008 | Feekes, Jr. | 713/324 |
| 7,457,970 B2 * | 11/2008 | Alba Pinto et al. | 713/300 |
| 7,805,620 B2 * | 9/2010 | Yang et al. | 713/300 |
| 2006/0156004 A1 * | 7/2006 | Alba Pinto et al. | 713/176 |
| 2006/0225046 A1 * | 10/2006 | Feekes, Jr. | 717/127 |
| 2007/0150763 A1 * | 6/2007 | Yang et al. | 713/300 |

FOREIGN PATENT DOCUMENTS

| | | |
|---|---|---|
| JP | 2008-204271 A | 9/2008 |
| KR | 1020060128562 A | 12/2006 |
| KR | 1020060131543 A | 12/2006 |

* cited by examiner

*Primary Examiner* — Ryan Stiglic
(74) *Attorney, Agent, or Firm* — Ladas & Parry LLP

(57) ABSTRACT

Provided is a low power consumption processor. The processor includes: a plurality of blocks; a memory storing instructions that control each of the plurality of blocks; and a multi power controller generates a signal that activates at least one of the plurality of blocks according to an address storing the instruction, and provides a normal power voltage or a reduction power voltage in response to the activation signal.

10 Claims, 4 Drawing Sheets

LOW POWER CONSUMPTION PROCESSOR

CROSS-REFERENCE TO RELATED APPLICATIONS

This U.S. non-provisional patent application claims priority under 35 U.S.C. §119 of Korean Patent Application No. 10-2008-0131065, filed on Dec. 22, 2008, the entire contents of which are hereby incorporated by reference.

BACKGROUND OF THE INVENTION

The present invention disclosed herein relates to a processor, and more particularly, to an embedded processor that consumes low power.

A processor can be classified into a single chip processor such as a central processing unit (CPU) used in a personal computer and an embedded processor used as a configuration block in a system on chip (SoC) such as various control chips or smart card chips. The embedded processor (e.g., MPU/MCU/DSP) is extensively used in a variety of operations and signal processing. In general, the embedded processor fetches, decodes, and executes an instruction. The embedded processor performs a series of processes such as processing a signal, reading the processed signal, and writing the processed signal. The highly functionalized embedded processor has increased power consumption and heat dissipation because the degree of integration is improved.

Energy efficiency is defined by performance/total power.

A unit of energy efficiency is MIPS/mW or millions of operations per second (MOPS)/mW. Millions Instruction Per Second (MIPS) is a typical unit indicating performance, and means that millions of instructions can be processed per second. While comparing with the above reference, if performance of the embedded processor is enhanced and power consumption is reduced, the embedded processor can achieve high energy efficiency.

In general, power consumption is proportional to the square of applied power voltage. Although decreasing of power voltage is the most effective way of reducing power consumption, low power voltage increases delay time. That is, the performance of a processor can be deteriorated.

SUMMARY OF THE INVENTION

The present invention provides a low power consumption processor.

Embodiments of the present invention provide processors including: a plurality of blocks; a memory storing instructions that control each of the plurality of blocks; and a multi power controller generates a signal that activates at least one of the plurality of blocks according to an address storing the instruction, and provides a normal power voltage or a reduction power voltage in response to the activation signal.

In some embodiments, each of the plurality of blocks includes a power supply providing a voltage according to dynamic voltage scaling.

In other embodiments, the power supply provides the normal power voltage or the reduction power voltage to an activated block among the plurality of blocks in response to the activation signal.

In still other embodiments, the power voltage varies raging from a level of the normal power voltage to a level of the reduction power voltage according to the dynamic voltage scaling.

In even other embodiments, the reduction power voltage is lower than the normal power voltage and drives each of the plurality of blocks.

In yet other embodiments, the plurality of blocks include: a core block receiving the instruction from the external to perform an operation; a peripheral device block controlled by the core block; and a memory unit storing data that are accessed by the core block.

In further embodiments, the core block includes a plurality of function units.

In still further embodiments, the core block interprets the inputted instruction and activates at least one necessary for executing the interpreted instruction among the plurality of function units.

In even further embodiments, the peripheral device block includes a plurality of units that are controlled by the core block.

In yet further embodiments, the core block interprets the inputted instruction and activates at least one necessary for executing the interpreted instruction among the plurality of peripheral units.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
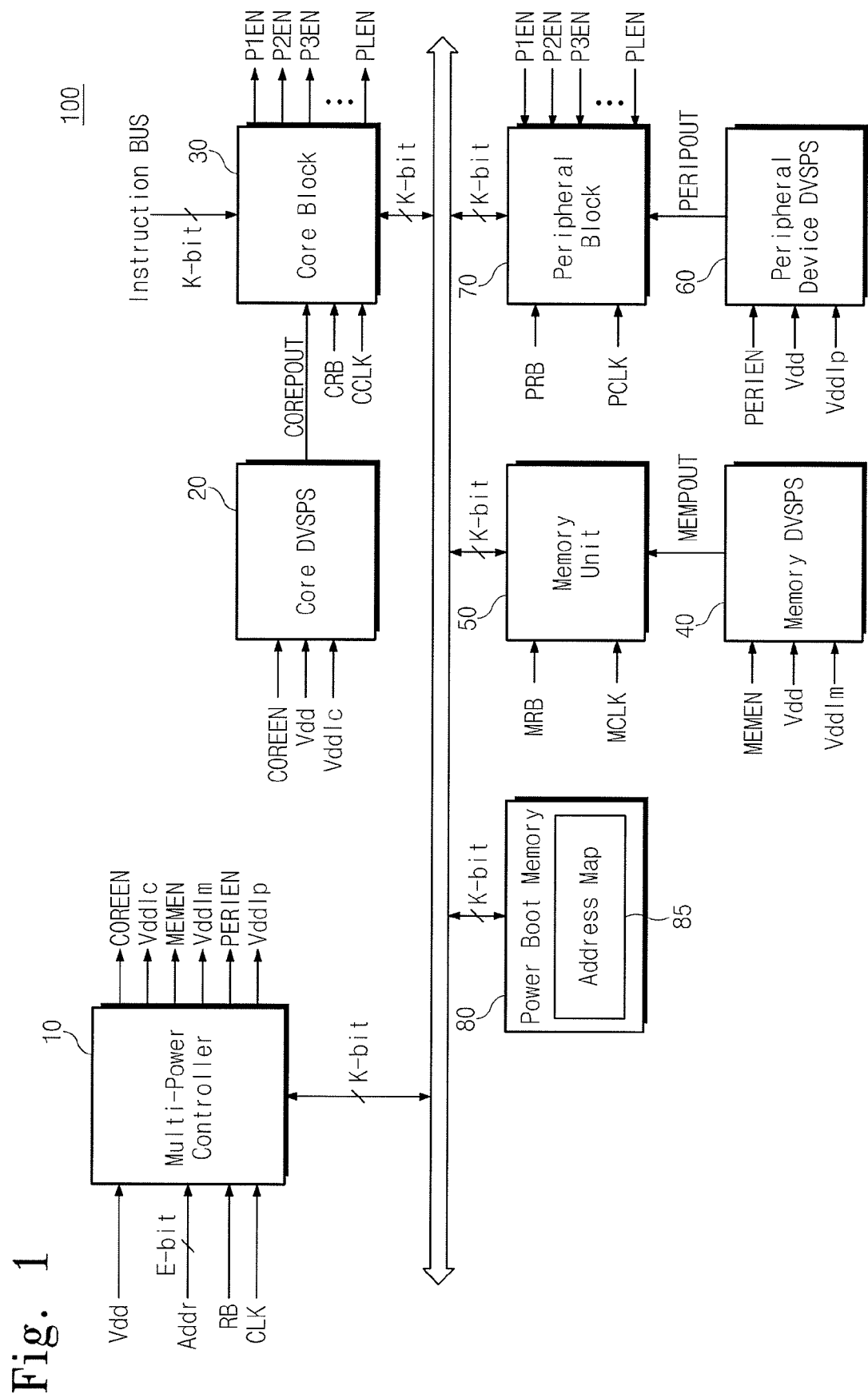
FIG. 1 is a block diagram of a processor according to an embodiment of the present invention.

FIG. 1 is a block diagram of a processor according to an embodiment of the present invention. A processor 100 of the present invention is a multi operating voltage low power consumption embedded processor.

Referring to FIG. 1, the processor 100 includes a multi power controller 10, a core dynamic voltage scaling power supply (hereinafter, referred to as core DVSPS) 20, a core block 30, a memory DVSPS 40, a memory unit 50, a peripheral device DVSPS 60, a peripheral device block 70, and a power boot memory 80.

The multi power controller 10 receives a normal power voltage Vdd to generate a core reduction power voltage Vddlc, a memory reduction power voltage Vddlm, and a peripheral device reduction power voltage Vddlp. Additionally, the multi power controller 10 generates a signal (such as COREEN, MEMEN, and PERIEN) that activates at least one of the core block 30, the memory unit 50, and the peripheral device block 70.

The normal power voltage Vdd has a voltage level that is higher than the core reduction power voltage Vddlc, the memory reduction power voltage Vddlm, and the peripheral device reduction power voltage Vddlp. Additionally, levels of the core reduction power voltage Vddlc, the memory reduction power voltage Vddlm, and the peripheral device reduction power voltage Vddlp are different from each other.

The normal power voltage Vdd is a power voltage that drives the core block 30, the memory unit 50, and the peripheral device block 70. The core reduction power voltage Vddlc is lower than the normal power voltage Vdd and is a minimum voltage that drives the core block 30.

The multi power controller 10 receives an address signal Addr from the power boot memory 80 via an E-bit address bus and generates at least one of an activation signal COREEN of the core block 30, an activation signal MEMEN of the memory unit 50, and an activation signal PERIEN of the peripheral device block 70.

The core DVSPS 20 applies an operating voltage COREPOUT to the core block 30 in response to the activation signal COREEN of the core block 30. The core block 30 performs an actual operation. An internal structure of the core block 30 will be described in more detail with reference to FIG. 2.

The core block 30 generates a signal that controls a plurality of peripheral units (L) in the peripheral device block 70. In order to reduce power of the peripheral device block 70, an operation for controlling the peripheral units will be described with reference to FIG. 4.

Figure 2:
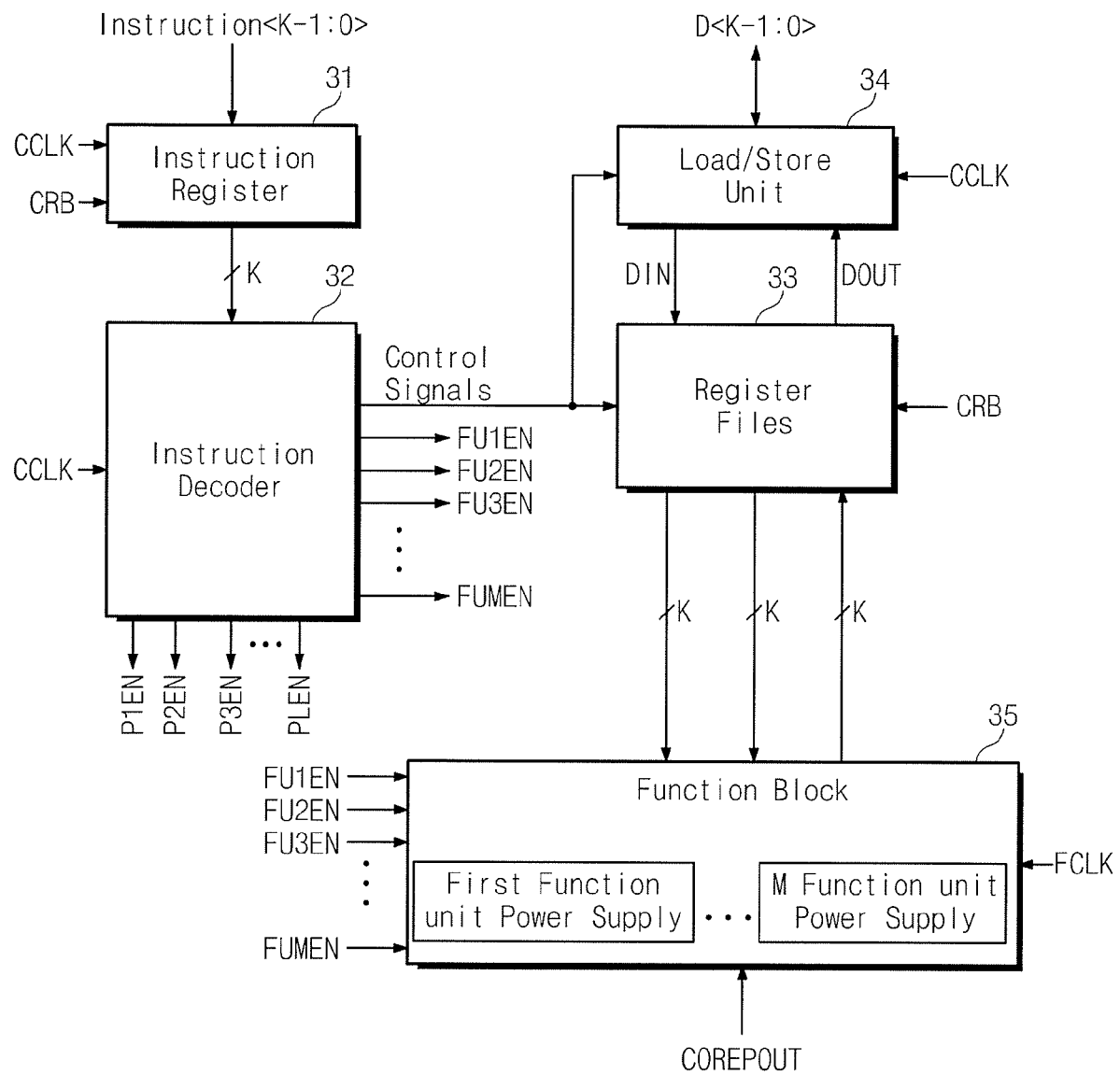
FIG. 2 is a block diagram of the core block of FIG. 1.

Additionally, the core block 30 internally includes a plurality of function units (shown in FIG. 3) and generates signals controlling the plurality of function units (M) by an instruction decoder (shown in FIG. 2). An operation for controlling the function units to reduce power of the core block 30 will be described in more detail in FIGS. 2 and 3.

The memory DVSPS 40 applies an operating voltage MEMPOUT to the memory unit 50 in response to the activation signal MEMEN of the memory unit 50 from the multi power controller 10. The memory unit 50 stores program and data.

The peripheral device DVSPS 60 applies an operating voltage PERIPOUT to the peripheral device block 70 in response to the activation signal PERIEN of the peripheral device block 70 from the multi power controller 10. The peripheral device block 70 includes a plurality of peripheral units (shown in FIG. 4) for data transmission with the core block 30, the memory unit 50, or the external.

The power boot memory 80 includes an address map 85. The address map 85 stores booting code or specific sequence. Accordingly, since an instruction based on an address is predetermined, the processor 100 can determine a block such as the core block 30 and the memory unit 50, which will be activated using an address.

For example, let's assume that an instruction for activating the core block 30 are stored in addresses Addr 1 to Addr 10, and an instruction for activating the peripheral device block 70 is stored in an address Addr 11 to Addr 30.

If 8 is inputted as an address in the multi power controller 10, the multi power controller 10 generates a signal COREEN for activating the core block 30. Accordingly, the core DVSPS 20 applies an operating voltage COREOUT to the core block 30 in response to the core block activation signal COREEN.

Accordingly, the processor 100 receives address information and applies an operating voltage to a block on which an instruction corresponding to the address will be executed. If not, a reduced power voltage is applied.

In relation to an operating voltage, a normal power voltage Vdd is dynamically reduced according to dynamic voltage scaling (DVS), or is increased to the normal power voltage Vdd after being reduced. The reduced power voltage includes a minimum voltage that can drive each of the core block 30, the memory unit 50, and the peripheral device block 70.

In the core DVSPS 20, if the activation signal COREEN is in a high state, the normal power voltage Vdd is outputted as the operating voltage COREPOUT and if the activation signal COREEN is in a low state, the core reduction power voltage Vddlc is outputted as the operating voltage COREPOUT. The normal power voltage Vdd outputted from the core DVSPS 20 shifts into the core reduction power voltage Vddlc or its opposition in a level of the normal power voltage Vdd in response to the DVS.

In the memory power supply 40, if the activation signal MEMEN is in a high state, the normal power voltage Vdd is outputted as the operating voltage MEMPOUT, and if the activation signal MEMEN is in a low state, the memory reduction power voltage Vddlm is outputted as the operating voltage MEMPOUT. The normal power voltage Vdd outputted from the memory DVSPS 40 shifts into the memory reduction power voltage Vddlm or its opposition in a level of the normal power voltage Vdd in response to the DVS.

In the peripheral device power supply 60, if the activation signal PERIEN is in a high state, the normal power voltage Vdd is outputted as the operating voltage PERIPOUT, and if the activation signal PERIEN is in a low state, the peripheral device reduction power voltage Vddlp is outputted as the operating voltage PERIPOUT. The normal power supply Vdd outputted from the peripheral device DVSPS 60 shifts into the peripheral device reduction power voltage Vddlp or its opposition in a level of the normal power voltage Vdd in response to the DVS.

FIG. 2 is a block diagram of the core block 30 of FIG. 1.

Referring to FIG. 2, the core block 30 includes an instruction register 31, an instruction decoder 32, a register file 33, a load/store unit 34, and a function block 35. An internal structure of the function block 35 will be described in more detail with reference to FIG. 3.

The function block 35 includes M function units and M function block power supplies corresponding thereto. The instruction register 31 is connected to a core reset CRB, a core clock CCLK, and a K-bit instruction bus IB<K-1:0> and stores an instruction temporarily.

The instruction decoder 32 receives a K-bit instruction inputted from the core clock CCLK and the instruction register 31, and generates signals FU1EN, FU2EN, FU3EN, and FUMEN, which control each of the function units.

The register file 33 receives control signals from the core reset CRB and the instruction decoder 32, and transmits or receives data to/from the function block 35. The load/store unit 34 loads data from the external or stores data (which are stored in the register file 33) in the external.

The core reset CRB signal is a signal that initializes the core block 30 and is synchronized with a reset signal RB. The core clock CCLK is synchronized with the clock CLK as a clock signal of the core block 30. The function unit clock FCLK is a clock that is applied to the function block 35.

Figure 3:
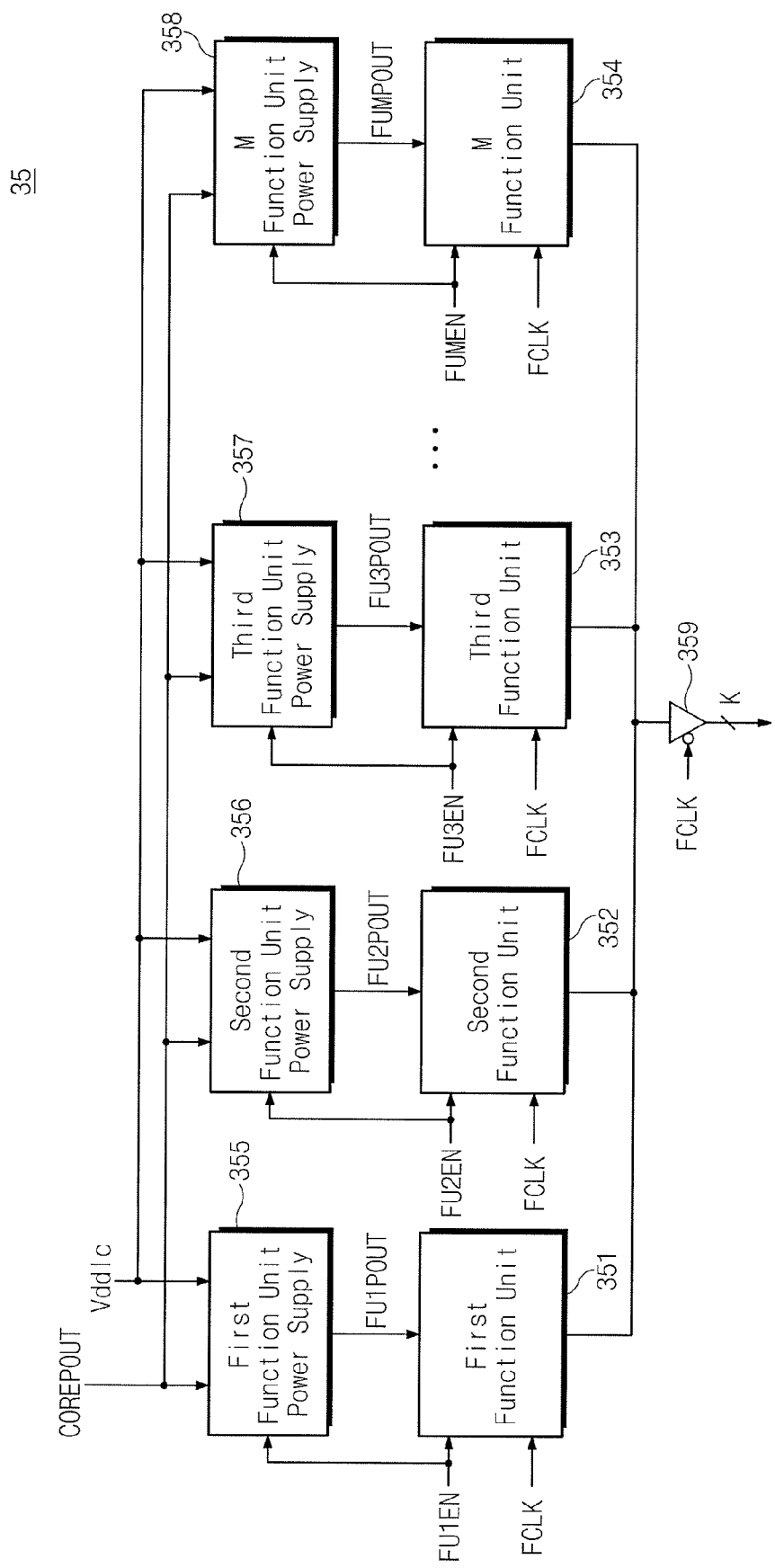
FIG. 3 is a block diagram illustrating function units of FIG. 1.

FIG. 3 is a block diagram illustrating function units of FIG. 1.

Referring to FIG. 3, the function block 35 includes M function units 351 to 354, M function unit power supplies 355 to 358, and a 3-state buffer 359. Each of the M function unit power supplies 355 to 358 applies operating voltages FU1POUT, FU2POUT, FU3POUT, and FUMPOUT to each of the M function units 351 to 354.

The 3-state buffer 359 is controlled by the inverted function unit clock FCLK and is connected to the M function units 351 to 354.

Referring to FIGS. 2 and 3, the first function unit power supply 355 applies an operating voltage FU1POUT to the first function unit 351 in response to the first function unit activation signal FU1EN transmitted from the instruction decoder 32.

The second function unit power supply 356 applies an operation voltage FU2POUT to the second function unit 352 in response to the second function unit activation signal FU2EN transmitted from the instruction decoder 32.

The third function unit power supply 357 applies an operating voltage FU3POUT to the third function unit 353 in response to the third function unit activation signal FU3EN transmitted from the instruction decoder 32.

Moreover, the M function unit power supply 358 applies an operating voltage FUMPOUT to the M function unit 354 in response to the M function unit activation signal FUMEN transmitted from the instruction decoder 32.

The function block 35 according to an embodiment of the present invention includes a plurality of function units and the controls signals that activate the plurality of function units, in order to apply an operating voltage to the activated function unit among the plurality of function units. Therefore, power consumption can be reduced.

Figure 4:
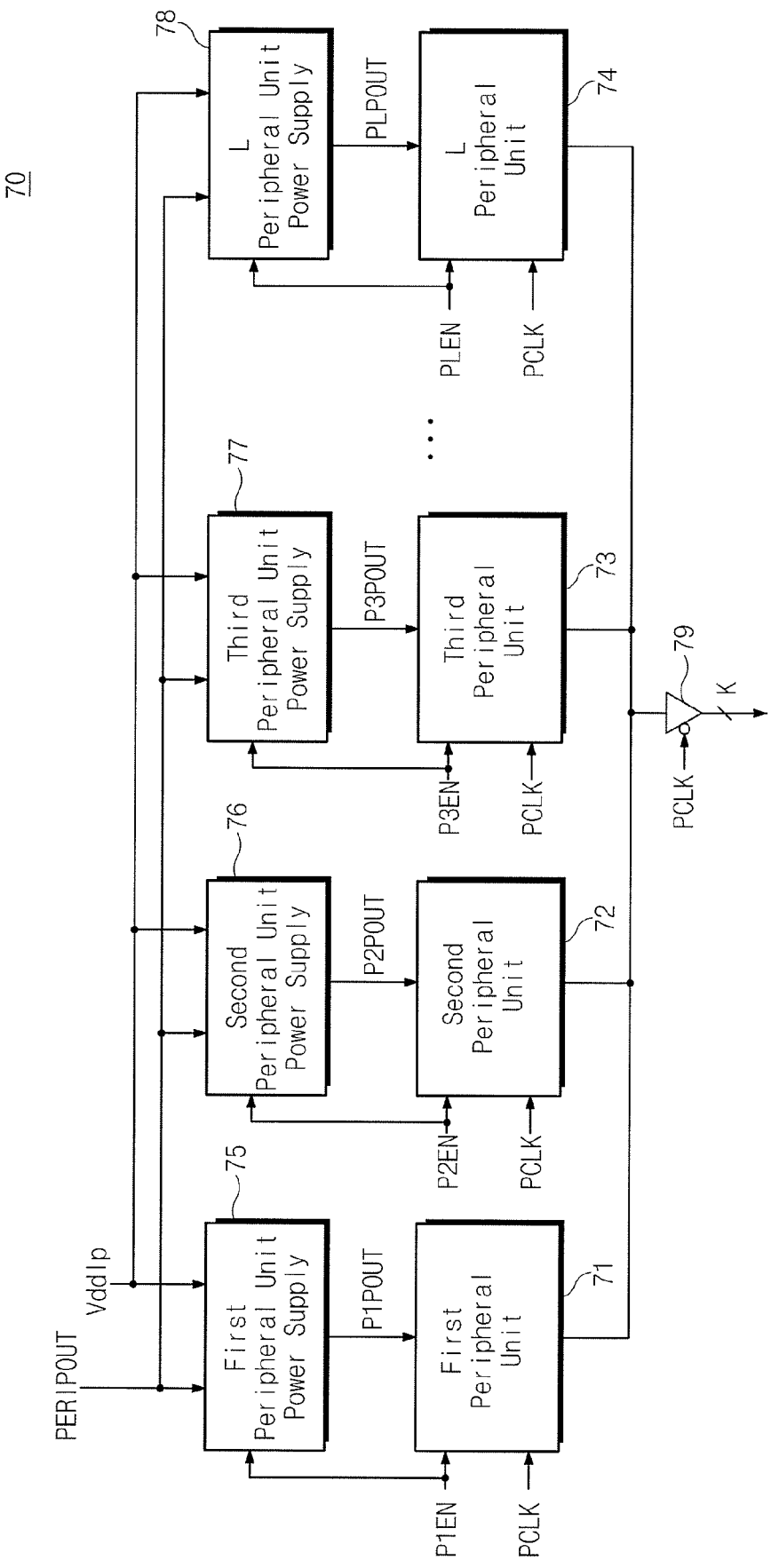
FIG. 4 is a block diagram illustrating the peripheral device block of FIG. 1.

FIG. 4 is a block diagram illustrating the peripheral device block of FIG. 1.

Referring to FIG. 4, the peripheral device block 70 includes L peripheral units 71 to 74, L peripheral unit power supplies 75 to 78, and a 3-state buffer 79. Each of the L peripheral unit power supplies 75 to 78 applies operating voltages P1POUT, P2POUT, P3POUT, and PMPOUT to each of the L peripheral units 71 to 74. The 3-state buffer 79 is controlled by the inverted peripheral device block clock PCLK, and is connected to the L peripheral units 351 to 354.

Referring to FIGS. 2 and 4, the first peripheral unit power supply 75 applies an operating voltage P1POUT to the first peripheral unit 71 in response to the first peripheral unit activation signal PU1EN transmitted from the instruction decoder 32.

The second peripheral unit power supply 76 applies an operating voltage P2POUT to the second peripheral unit 72 in response to the second peripheral unit activation signal PU2EN transmitted from the instruction decoder 32.

The third peripheral unit power supply 77 applies an operating voltage P3POUT to the third peripheral unit 73 in response to the third peripheral unit activation signal PU3EN transmitted from the instruction decoder 32.

The L peripheral unit power supply 78 applies an operating voltage PLPOUT to the L peripheral unit 74 in response to the L peripheral unit activation signal PULEN transmitted from the instruction decoder 32.

The peripheral device block 70 of the present invention includes a plurality of peripheral units, and controls signals that activate the plurality of peripheral units in order to apply an operating voltage to an activated peripheral unit among the plurality of peripheral units. Accordingly, power consumption can be reduced.

A processor of the present invention activates at least one of a core block, a memory block, and a peripheral device block in response to a signal that is activated based on an address map.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A processor comprising:
a plurality of blocks,
wherein the plurality of blocks comprises at least a core block, a peripheral block, and a memory unit;
a memory storing instructions that control each of the plurality of blocks; and
a multi power controller generates a signal that activates at least one of the plurality of blocks according to an address storing the instruction, and provides a normal power voltage or a reduction power voltage in response to the activation signal,
wherein the activation signal has at least one of a high state and a low state
wherein each of the plurality of blocks comprises a power supply providing the reduction power voltage based on dynamic voltage scaling,
wherein the reduction power voltage for each of the plurality of blocks that has been activated by the respective activation signal with the low state drives the respective block,
wherein a level of reduction power voltage for each of the plurality of blocks that has been activated by the respective activation signal with the low state are different, and
wherein the normal power voltage for each of the plurality of blocks that has been activated by the respective activation signal with the high state drives the respective block.

2. The processor of claim 1, wherein the power supply provides the normal power voltage or the reduction power voltage to the activated block among the plurality of blocks in response to the activation signal.

3. The processor of claim 1, wherein the power voltage varies raging from the normal power voltage to the level of the reduction power voltage for each of the plurality of blocks according to the dynamic voltage scaling for each of the plurality of blocks.

4. The processor of claim 1, wherein the reduction power voltage is lower than the normal power voltage.

5. The processor of claim 1, wherein the plurality of blocks comprise:
the core block receiving the instruction from externally to perform an operation;
the peripheral device block controlled by the core block; and
the memory unit storing data that are accessed by the core block.

6. The processor of claim 5, wherein the core block comprises a plurality of function units.

7. The processor of claim 6, wherein the core block interprets the inputted instruction and activates at least one necessary for executing the interpreted instruction among the plurality of function units.

8. The processor of claim 5, wherein the peripheral device block comprises a plurality of units that are controlled by the core block.

9. The processor of claim 8, wherein the core block interprets the inputted instruction and activates at least one necessary for executing the interpreted instruction among the plurality of peripheral units.

10. A processor comprising:
a plurality of blocks, wherein the plurality of blocks comprises at least a core block, a peripheral block, and a memory unit;

a memory storing instructions that control each of the plurality of blocks; and a multi power controller generates a signal that activates at least one of the plurality of blocks according to an address storing the instruction, and provides a normal power voltage or a reduction power voltage in response to the activation signal, wherein the activation signal has at least one of a high state and a low state wherein each of the plurality of blocks comprises a power supply providing the reduction power voltage based on dynamic voltage scaling, wherein the reduction power voltage for each of the plurality of blocks that has been activated by the respective activation signal with the low state drives the respective block, wherein a level of reduction power voltage for each of the plurality of blocks that has been activated by the respective activation signal with the low state are different, and wherein the normal power voltage for each of the plurality of blocks that has been activated by the respective activation signal with the high state drives the respective block, and wherein the reduction power voltage for the core block that has been activated by the activation signal with the low state is a minimum voltage for driving the core block.

* * * * *